Figures 1, 2:
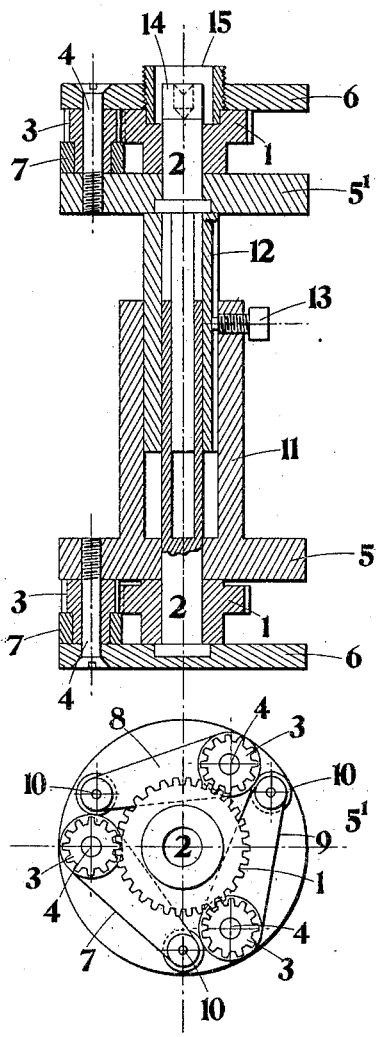

G. GABRIEL.
CENTERING DEVICE.
APPLICATION FILED APR. 8, 1912.

1,089,407.

Patented Mar. 10, 1914.
2 SHEETS—SHEET 1.

Witnesses—

Inventor
Gustav Gabriel
by
Attorney.

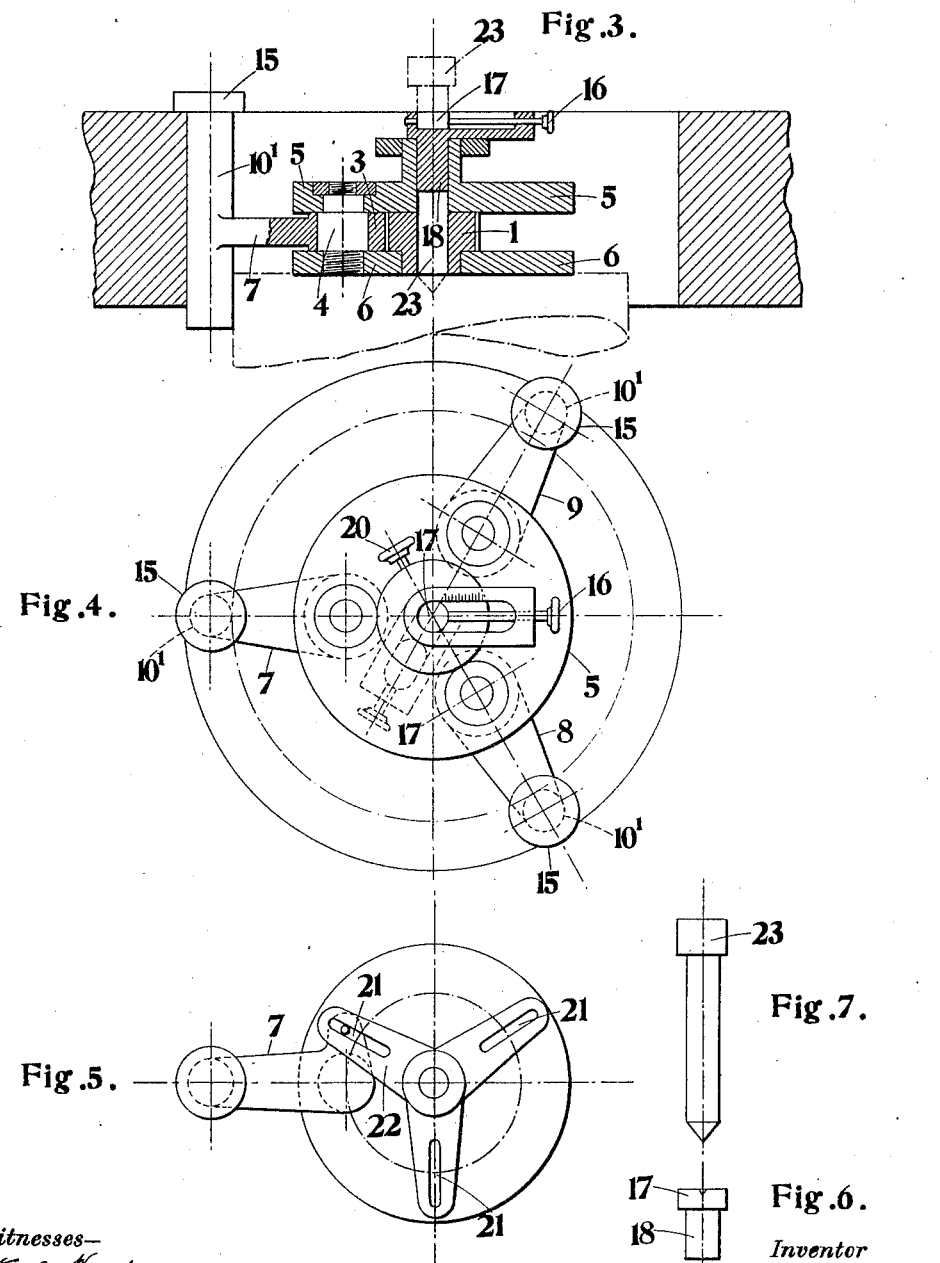

UNITED STATES PATENT OFFICE.

GUSTAV GABRIEL, OF OFFENBACH-ON-THE-MAIN, GERMANY.

CENTERING DEVICE.

1,089,407. Specification of Letters Patent. Patented Mar. 10, 1914.

Application filed April 8, 1912. Serial No. 689,348.

*To all whom it may concern:*

Be it known that I, GUSTAV GABRIEL, a subject of the German Emperor, residing at Offenbach-on-the-Main, Grand Duchy of Hesse, Germany, engineer, have invented certain new and useful Improvements in Centering Devices, of which the following is a specification.

This invention relates to a centering device having two toothed wheel gears movable upon a common shaft.

The novelty of the invention consists in the arrangement of three levers which are swung outward by means of a common driving wheel and which at their outer extremities are provided with rollers or pins, which levers contact with the inner walls of the hollow body, which is being operated upon.

In the accompanying drawing Figure 1 is a longitudinal section of the device. Fig. 2 is a plan corresponding thereto. Fig. 3 illustrates a modification in longitudinal section provided both for a hollow and for a solid body. Fig. 4 is a plan corresponding thereto. Fig. 5 shows a plan of the device provided with different operating mechanism for the oscillatory levers. Fig. 6 shows the stationary central carrier. Fig. 7 shows the center which, as shown in Fig. 3, is adapted for the purpose of supporting shafts in the hollow shaft of the center.

The device is composed of two separate parts which are driven from a common shaft and which, as shown in Fig. 3, can also be employed separately. Each of the two parts consists of a large toothed wheel 1, which is mounted upon the common shaft 2, and of three small toothed wheels 3 which engage with the central toothed wheel. These small toothed wheels rotate on pins 4 which are screwed into the plates 5, $5^1$ and 6. Levers 7, 8 9 are rigidly secured to the small toothed wheels 3. The levers are at their outer extremities provided with small rollers 10 (Fig. 2) for the purpose, on finding the center, to prevent the production of any great frictional resistances.

The plate 5 is on one side provided with a sleeve 11 and the plate $5^1$ is provided with a shaft 12 which projects into the sleeve 11, so that it is possible to adjust the position of the toothed wheel gears. By means of the set screw 13 any desired adjustment can be effected.

In the center of both plates 5, $5^1$ is mounted the shaft 2 of the driving toothed wheel 1, which shaft as shown in Fig. 1 of the drawing, consists of two shaft members which telescope into one another and are coupled together.

If the square part 14 of the shaft 2 is rotated, then naturally, the two toothed wheels 1 are also rotated and in their turn rotate the toothed wheels 3, which are in engagement therewith and the levers connected to the latter, of which the rollers 10 come into contact with the interior walls of the hollow body at each outward movement.

On the rollers contacting with the inner walls of the hollow body, the shaft 2 is brought into its central position and by tightening the screw 15′ against the toothed wheel 1, the entire device is arrested so that the desired center can be retained conveniently and retained during any required time. The arrangement can also be as shown in Fig. 3 where only one part of the hereinbefore described apparatus is employed. The device can then be advantageously employed if long hollow bodies are not to be operated upon, and also permits of centering solid cylinders, shafts and the like. The levers in this case are so provided that the rollers 10 are unnecessary and are replaced by pins $10^1$ having projections 15, which latter contact with the outer edge of the hollow body whereas the pin $10^1$ contacts with the inner wall thereof.

It is important that the device permits that the center which it is desired to ascertain always remains in the plane of the upper hole. When finding the center of shafts, on the employment of the center 23, the pins $10^1$ of the levers contact with the periphery of the shafts.

The adjustment of the center of holes which are not operated upon or for supporting eccentric bodies, a center member 17 is provided which is adjustable by means of a screw 16, and capable of rotation on a pin 18 the member 17 being retained in every desirable position by a screw 20.

In the dotted lines (Fig. 3) the center is shown in another position. The movement of the oscillatory levers 7, 8, 9 can as shown in Fig. 5 be effected by means of levers 22 provided with slots 21, in which case the levers are provided as bell crank levers.

What I claim as my invention and desire to secure by Letters Patent is:—

1. A centering device comprising a shaft, said shaft consisting of telescopic members, rotary members disposed at the respective ends of the shaft, stationary members mounted on said shaft, adjacent said rotary members, oscillatory levers mounted on said stationary members and means connecting the oscillatory levers to the rotary members.

2. A centering device comprising a shaft, said shaft consisting of telescopic members, rotary members disposed at the respective ends of the shaft, stationary members mounted on said shaft, adjacent said rotary members, oscillatory levers mounted on said stationary members and means connecting the oscillatory levers to the rotary members, and means for fixing the oscillatory members in position.

3. A centering device comprising a shaft, said shaft consisting of telescopic members, rotary members disposed at the respective ends of the shaft, stationary members mounted on said shaft, adjacent said rotary members, oscillatory levers mounted on said stationary members and means connecting the oscillatory levers to the rotary members, and means for fixing the oscillatory members in position, and means for supporting the work to be centered.

4. A centering device comprising telescoping members, said telescoping members forming a shaft, large toothed wheels mounted at the extremities of said shaft, stationary members mounted on said shaft adjacent said toothed wheels, small toothed wheels mounted on said stationary members and gearing with the large toothed wheels, levers fixed to the small toothed wheels, and means for fixing the levers in position.

In testimony whereof I have hereunto signed my name to this specification in the presence of two subscribing witnesses.

GUSTAV GABRIEL.

Witnesses:
KARL BURKMANN,
JEAN GRUND.

---

Copies of this patent may be obtained for five cents each, by addressing the "Commissioner of Patents. Washington, D. C."